(12) United States Patent
Lai (10) Patent No.: US 8,185,051 B2
(45) Date of Patent: *May 22, 2012

(54) PING FEATURE FOR ELECTRONIC DEVICES

(75) Inventor: Frederick Lai, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/973,288

(22) Filed: Dec. 20, 2010

(65) Prior Publication Data

US 2011/0281521 A1 Nov. 17, 2011

Related U.S. Application Data

(63) Continuation of application No. 11/020,318, filed on Dec. 27, 2004, now Pat. No. 7,869,762.

(30) Foreign Application Priority Data

Dec. 23, 2004 (EP) ..................................... 04106973

(51) Int. Cl.
*H04B 7/00* (2006.01)
(52) U.S. Cl. ........ 455/41.2; 455/39; 455/70; 340/572.1; 340/825.49
(58) Field of Classification Search .................... 455/39, 455/41.2, 70; 340/572.1, 825.49
See application file for complete search history.

(56) References Cited

U.S. PATENT DOCUMENTS

| | | | |
|---|---|---|---|
| 5,606,560 A | 2/1997 | Malek et al. | |
| 5,903,844 A | 5/1999 | Bruckert et al. | |
| 6,087,933 A | 7/2000 | Addy et al. | |
| 6,269,257 B1 | 7/2001 | Cannon et al. | |
| 6,297,737 B1 * | 10/2001 | Irvin ............................. | 340/571 |
| 2002/0014955 A1 | 2/2002 | Klitsgaard et al. | |
| 2002/0081970 A1 | 6/2002 | Wingren | |
| 2002/0101343 A1 * | 8/2002 | Patton .......................... | 340/505 |
| 2003/0097563 A1 | 5/2003 | Moroney et al. | |
| 2006/0058018 A1 | 3/2006 | Toulis et al. | |

FOREIGN PATENT DOCUMENTS

WO 2003/058572 A 7/2003

OTHER PUBLICATIONS

ICM Type Numbers, http://www.iana.org/assignments/icmp-parameters, last updated on Nov. 6, 2003, pp. 1-5.
J. Postel, ISI, RFC 768 (rfc768)—User Datagram Protocol, http://ww.faqs.org/rfcs/rfc768.html, Aug. 28, 1980, pp. 1-4.
RFC 793 (rfc793)—Transmission Control Protocol, Information Sciences Institute, University of Southern California, 4676 Admiralty Way, Marina del Rey, California 90291, http://www.faqs.org/rfcs/rfc793.html, Sep. 1981, pp. 1-68.
J. Postel, ISI, RFC 792 (rfc792)—Internet Control Message Protocol, http://www.faqs.org/rfcs/rfc792.html, Sep. 1981, pp. 1-15.
ActiveWin.com: Frequently Asked Questions—USB 1.0 Revision—1.3, http://www.activewin.com/faq/usb.shtml, pp. 1-4.

* cited by examiner

*Primary Examiner* — Tuan H Nguyen (57) ABSTRACT

A pinging electronic device, a pingable electronic device and a network for the devices are disclosed. The ping electronic devices comprising a ping function and a transmitter wherein the ping function is adapted to generate and the transmitter is adapted to transmit over an ad hoc wireless network at least one associated ping control message to at least one pingable electronic device paired to the pinging electronic device for actuation of at least one indicator element of the at least one pingable electronic device.

23 Claims, 4 Drawing Sheets

PING FEATURE FOR ELECTRONIC DEVICES

CROSS REFERENCE TO RELATED APPLICATION

This application is a continuation application of U.S. patent application Ser. No. 11/020,318 filed on Dec. 27, 2004, which claims the benefit thereof, and U.S. patent application Ser. No. 11/020,318 filed on Dec. 27, 2004 claims the benefit of European patent Application No. 04106973.3 filed on Dec. 23, 2004.

FIELD OF THE APPLICATION

This application is related to wireless radio frequency communication networks, and more particularly, to a system and method for identifying and locating electronic devices in the network.

BACKGROUND

Electronic devices can be interconnected by a variety of means including wires, cables, radio signals and infrared light beams. Wireless communication such as infrared light beams and radio signals have become increasingly popular communication means, particularly in the field of consumer electronics. With the increasing number of electronic devices available, consumers want their electronic devices to be able to communicate with each other, even if the manufacturers differ. The Bluetooth standard has been developed to allow electronic devices produced by different manufacturers to communicate with each other using ad hoc wireless communication links, established between pairs of devices, one of the devices typically being a peripheral such as a handset or a printer.

In response to a consumer demand for simplification, the Bluetooth standard (see "Specification of the Bluetooth System: Wireless Connections Made Easy", Version 1.2 (5 Nov. 2003) http:/www.Bluetooth.com) allows electronic devices to establish communications with minimal need for input from the user.

SUMMARY

According to a broad aspect, there is provided a pinging electronic device comprising a ping function and a transmitter wherein the ping function is adapted to generate and the transmitter is adapted to transmit over an ad hoc wireless network at least one associated ping control message to at least one pingable electronic device paired to the pinging electronic device for actuation of at least one indicator element of the at least one pingable electronic device.

In some embodiments, the pinging electronic device is a master device. In other embodiments, the pinging electronic device is a peripheral device.

According to a further broad aspect, the invention provides a pingable electronic device comprising a receiver, a ping message processor, and at least one indicator element wherein the receiver is adapted to receive a ping control over an ad hoc wireless network message and the ping message processor is adapted to actuate the at least one indicator element in response to the ping control message.

In some embodiments, an ad hoc wireless network including a plurality of pingable electronic devices further comprises a pinging electronic device comprising a ping function and a transmitter wherein the pinging electronic device is paired to the plurality of pingable electronic devices and wherein the ping function is adapted to generate and the transmitter is adapted to transmit over an ad hoc wireless network the ping control message to the plurality of pingable electronic devices.

In some embodiments, the ping function is adapted to ping all of the plurality of pingable electronic devices.

In some embodiments, the ping function is adapted to ping a subset of the plurality of pingable electronic devices based on a user selection.

In some embodiments, the ping control message contains instructions which define which of the at least one indicator elements are actuated.

In some embodiments, the ping control message sent to each of the at least one pingable electronic devices is identical.

In some embodiments, the ping control message sent to each of the at least one pingable electronic devices is unique.

In some embodiments, the ad hoc wireless network is a Bluetooth capable network or a Bluetooth like network.

In some embodiments, the ping message processor of each of the at least one pingable electronic devices is adapted to decode whether the ping control message contains instructions to ping the pingable electronic device.

According to one broad aspect, the invention provides a computer usable medium having computer readable program code means embodied therein for causing a ping message to be sent over an ad hoc wireless network, the computer readable code means comprising: a computer readable code means for processing a received ping input command; a computer readable code means for generating a ping message; a computer readable code means for instructing a transmitter to transmit the ping message.

In some embodiments, the computer readable code means for generating a ping message further comprises a computer readable code means for generating the ping message for pinging a plurality of pingable electronic devices.

In some embodiments, the computer readable code means for generating a ping message further comprises: a computer readable code means for generating the ping message for pinging a subset of a plurality of pingable electronic devices based on a user selection.

In some embodiments, the computer readable code means for generating a ping message further comprises: a computer readable code means for generating a ping control message containing instructions which specify which indicator elements are actuated.

According to one broad aspect, the invention provides a computer usable medium having computer readable program code means embodied therein for receiving and implementing a ping message from an ad hoc wireless network, the computer readable code means comprising; a computer readable code means for processing a received ping message; a computer readable code means for instructing a indicator element in response to the ping message.

DETAILED DESCRIPTION OF THE PREFERRED EMBODIMENTS

Figure 1A:
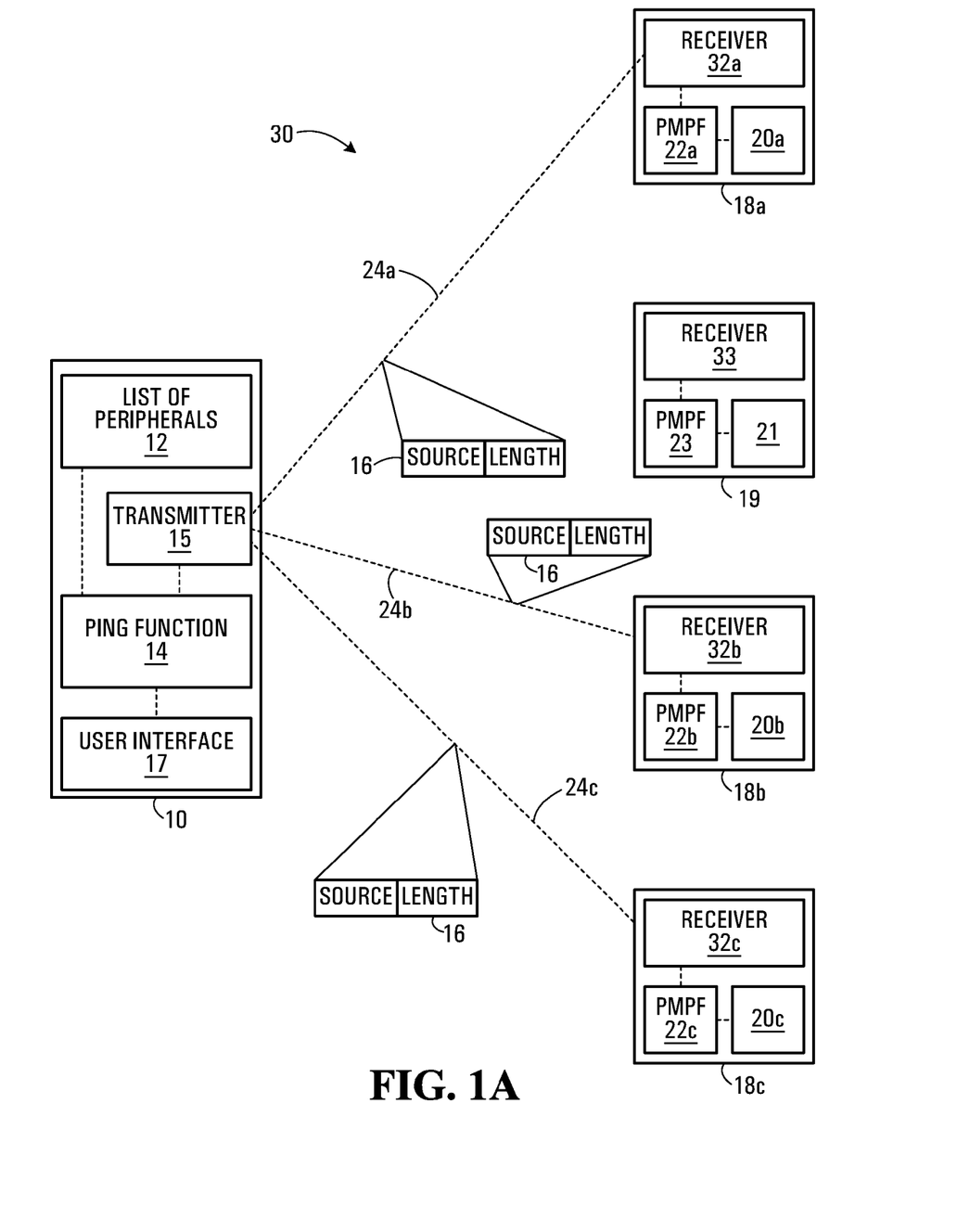
FIG. 1A is a schematic view of an embodiment of a wireless communication network.

FIG. 1A shows an ad hoc wireless network 30 provided by an embodiment of the application. The network 30 is comprised of a master device 10, such as a telephone handset, PDA, computer or other such electronic device.

Network 30 also comprises a plurality of network peripherals 18a, 18b, 18c which are also electronic devices such as telephone headsets, PDA's, telephone handsets, or computers. An isolated peripheral 19 is also depicted in FIG. 1A. The isolated peripheral 19 does not form part of the network 30 at the instant depicted in FIG. 1A.

In the embodiment of FIG. 1A, the master device 10 is in communication with or "paired with" network peripherals 18a, 18b, 18c over communication channels 24a, 24b, 24c respectively. The master device 10 includes a transmitter 15 for transmitting to the network peripherals 18a, 18b, 18c. The transmitter 15 may take any form known in the art including being a combined transceiver.

The master device 10 contains a list of peripherals 12 or other means of identifying the network peripherals 18a, 18b, 18c to which the master device 10 is connected and identifying communications channels 24a, 24b, 24c to the network peripherals 18a, 18b, 18c. The list of peripherals 12 is typically easily accessible to the user. The list of peripherals 12 is first generated when the network 30 is set up and the pairing between the master device 10 and the network peripherals 18a, 18b, 18c is established. The list of peripherals 12 is dynamic; it can change over time as peripherals are added to or deleted from the network 30.

If the network 30 is established according to the Bluetooth standard, no user input is required to establish the network 30 so the user may be unaware of the pairings which have been established in the network 30. Alternatively, even if the user is initially aware of the pairings, if time has elapsed since the network 30 was initially established, the pairings which were made may have been forgotten or the user may have misplaced one or more of the network peripherals 18a, 18b, 18c. Accordingly, it is desirable to have a system of identifying which of the peripherals 18a, 18b, 18c, 19 are paired with the master device 10 and of identifying the location of the network peripherals 18a, 18b, 18c.

The master device 10, therefore, includes a ping function 14. The ping function 14 may be provided in software, hardware, firmware or other means known in the art. The ping function 14 is initiated through a user interface 17.

The peripherals 18a, 18b, 18c, 19 each have a ping message processing function (PMPF) 22a, 22b, 22c, 23 respectively. The ping message processing functions 22a, 22b, 22c, 23 allow peripherals 18a, 18b, 18c, 19 to receive and respond to a message from the ping function 14. The ping message processing functions 22a, 22b, 22c, 23 may be provided in software, firmware, hardware or other means known in the art.

Each of the peripherals 18a, 18b, 18c, 19 preferably has at least one indicator element 20a, 20b, 20c, 21 respectively. The indicator elements 20a, 20b, 20c, 21 generate an indication that is audible, visible, tactile, or otherwise perceptible to the user.

The indicator elements may, to some extent, be determined by the type of peripherals 18a, 18b, 18c, 19. For example, peripherals with lights may use flashing lights as indicator elements, peripherals with microphones may use beeps or other tones as indicator elements, peripherals with a vibrate option may use vibration as an indicator element. Preferably, the indicator elements 20a, 20b, 20c, 21 are components of the peripherals 18a, 18b, 18c, 19 which are inherent in the peripherals 18a, 18b, 18c, 19, such as a speaker or other transducer on a telephone, and are not dedicated components for use as the indicator elements 20a, 20b, 20c, 21.

The peripherals 18a, 18b, 18c, 19 further include receivers 32a, 32b, 32c, 33 respectively for receiving transmissions from the transmitter 15 of the master device 10. The receivers 32a, 32b, 32, 33 may take any form known in the art including being combined transceivers.

The initiation of the ping function 14 generates a ping control message 16 which contains instructions for the ping message processing function 22a, 22b, 22c. The components of the ping control message 16 will be dictated by the communication protocol of the communication channels 24a, 24b, 24c of the network 30. In some embodiments, a single message is transmitted by the transmitter 15, and the message is received and processed by each peripheral that is paired. In another embodiment, a separate message is transmitted to each peripheral. The separate message may be identical, or they may be different for each peripheral. For example, in one embodiment, each message contains a peripheral-specific destination address. The ping control message 16 depicted in FIG. 1A is a single message containing source and length, which is sent to all the paired peripherals 18a, 18b, 18c.

In operation, the user initiates the ping function 14 which generates the ping control message 16. The ping function 14 instructs the transmitter 15 to send the ping control message 16 over the communication channels 24a, 24b, 24c to the receivers 32a, 32b, 32c of the network peripherals 18a, 18b, 18c which are paired with the master device 10. The isolated peripheral 19 is not paired with the master device 10. Accordingly, the ping control message 16 is not sent to the isolated peripheral 19.

The ping message processing functions 22a, 22b, 22c receive the ping control message 16 through the receivers 32a, 32b, 32c and actuate the indicator elements 20a, 20b, 20c in accordance with the instructions contained in the ping control message 16.

The indicator elements 21 of the isolated peripheral 19 are not actuated. The user can then easily locate the network peripherals 18a, 18b, 18c based on observation of the indicator elements 20a, 20b, 20c, 21. For example, if the master device 10 is a telephone handset, network peripheral 18a and the isolated peripheral 19 are telephone headsets, and the indicator elements 20a and 21 are beeping functions, then if the network peripheral 18a and the isolated peripheral 19 are placed adjacent each other, the user can quickly and easily identify which headset is paired to the handset by observing which headset is beeping. Similarly, if the headset network peripheral 18a is misplaced, then it can be easily located by the user by following the sound of the beeping. This scenario may occur when multiple electronic devices are present, for example, in a user's home where there are multiple telephone handsets, headsets, computers, personal digital assistances (PDA's) and similar devices, and the user may not know, which headset is communicating with which handset or which printer is communicating with a computer. Additionally, small wireless devices such as headsets, handsets and PDA's can easily be misplaced.

In another embodiment, a plant manufacturing Bluetooth electronic devices requires quality control testing to determine if an electronic device under test is correctly paired with a chosen master device. It is cumbersome and slow to check for the correct pairing by using the machine address in the generic user interface of the electronic device to conduct the test. Instead, the ping method described above is used to conduct quality control testing. In order to pass the quality control test, an operator tests each electronic device that comes off of the line by pairing it to a reference PDA and pinging the PDA to ensure that the paired device is the electronic device currently in the operator's hand and not an electronic device from the adjacent assembly line.

Although three network peripherals 18a, 18b, 18c are shown in FIG. 1A, it will be understood that network 30 is a dynamic network and any number of network peripherals allowed by the network specification may be present in the network 30 at different points in time.

It is preferred that all of the peripherals 18a, 18b, 18c, 19 include the ping message processing functions 22a, 22b, 22c, 23. However, it may be that only some of the peripherals 18a, 18b, 18c, 19 have the ping message processing functions 22a, 22b, 22c, 23.

Preferably, the network 30 of FIG. 1A is established using Bluetooth or Bluetooth-like technology. In a Bluetooth network, the network peripherals 18a, 18b, 18c are not necessarily continuously communicating with the master device 10. While the network peripherals 18a, 18b, 18c are not communicating with the master device 10, the communication channels 24a, 24b, 24c are asynchronous Bluetooth channels which are bursty in nature. The Bluetooth standard has three modes of radio operation, each of which has its own characteristics, but typically, the network peripherals 18a, 18b, 18c will maintain radio silence for a duration specified by the Bluetooth specification and wake up for a predetermined window period to wait for an event (i.e. a message) from the master device 10. If an event is received from the master device 10 which is destined to one of the network peripherals 18a, 18b, 18c, the peripheral will "wake up" and begin more active radio communications with the master device.

In the Bluetooth specification, each of the network peripherals 18a, 18b 18c can theoretically see all of the communications from all nearby network peripherals 18a, 18b 18c; however, in practice, most Bluetooth communications are encrypted. As well, the Bluetooth specification requires that each electronic device in the network 30 only be active on certain frequencies during window periods determined by a frequency-hopping algorithm (see page 316 in the pdf of the Bluetooth 1.2 specification). Thus, in the Bluetooth application, each network peripherals 18a, 18b, 18c only "sees" its own communication channels 24a, 24b, 24c, respectively. In practice, the Bluetooth application can accommodate a single message sent to one network peripheral or separate messages sent to each peripheral which may be identical or unique.

Although FIG. 1A depicts one message 16 broadcast to all of the paired network peripherals 18a, 18b, 18c, alternatively, different messages can be targeted to individual peripheral devices. The targeted messages can be repeated creating a multiple-device poll. The ping message processing function 22a, 22b, 22c, includes a means of decoding the targeted message for the respective network peripheral 18a, 18b, 18c.

If the network 30 is established according to the Bluetooth standard, the form of the ping control message 16 can be implemented in various ways. Depending on which protocol is used to adapt the functionality, the code used to identify the ping feature will vary.

In one embodiment, if the ping function were made a part of the Bluetooth HCI protocol, it could be defined as:
OpCode Octet 16, bit 6 (page 530 in the pdf of the Bluetooth 1.2 specification).

In another embodiment, if the ping function were part of the ICMP Protocol, it could be defined as Type 41, which is currently unused. The code field could be used for the operation code defined below.
(See http://www.iana.org/assignments/icmp-parameters—list of Type codes.)

In other embodiments the ping functionality can be built over User Data Protocol (UDP) specified by RFC 768 (http://www.faqs.org/rfcs/rfc768.html), Transmission Control Protocol (TCP) specified by RFC 793 (http://www.faqs.org/rfcs/rfc793.html) or other transport by defining a format in the payload:
Payload:
First 4 bytes indicate operation code:
0x00000000—PING
0x00000001 through 0xffffffff—undefined.
For 0x00000000—PING:
Next byte—OPCode parameters as defined below.
The opcode parameter information on the other hand can be constant irrespective of the opcode that is defined.
In one embodiment the following pre-defined payload messages can be used:
<Value>—<Meaning>
0x00—ping, perform UI notification, no reply
0x01—ping, perform UI notification, send PING reply (PING-back).
0x02-0xff—undefined.
Examples of the implementation of the ping message processing functions 22a, 22b, 22c, 23 are as follows:
Software case: In an embodiment where the peripheral is a local area network (LAN) interface card Bluetooth peripheral which must be plugged into a personal computer (PC) (via universal serial bus (USB) (http://www.activewin.com/faq/usb.shtml), for instance), the ping event notification can be implemented by posting an event to the host computer where a user interface (UI) message, sound, blinking of an icon, or other mechanism would tell the user that an incoming ping was detected.
Firmware case: In another embodiment, instructions to a central processing unit (CPU) for detecting and handling the ping message are stored in flash random access memory (RAM), or other re-writable non-volatile storage medium.
Hardware case: In a further embodiment instructions to a central processing unit (CPU) for detecting and handling the ping message are stored in a non-volatile storage medium that is not re-writable, such as a silicon microchip.

The example of indicator elements 20a, 20b, 20c, 21 given in connection with of FIG. 1A immediately generate an indication. However, the ping control message 16 may alternatively be stored in a retrieval system such as a hard disk and reported to the user at a later time. A ping back indicator element can alternatively be used if the peripheral has a transmitter and the master device has a receiver. The indicator element of the peripheral can be a reply to the ping message which is another ping message transmitted back to the master device.

The network 30 is preferably a Bluetooth network but, more generally, can be any network which is ad-hoc wireless, open to interference between endpoints (i.e. electronic devices), and has the possibility of ambiguity regarding the associations between endpoints. For example, the application may be used in a WI-FI (802.11) network to determine the access point with which a device is currently associated. The application may also be used in a peer-to-peer system where two computers are connected haphazardly.

Figure 1B:
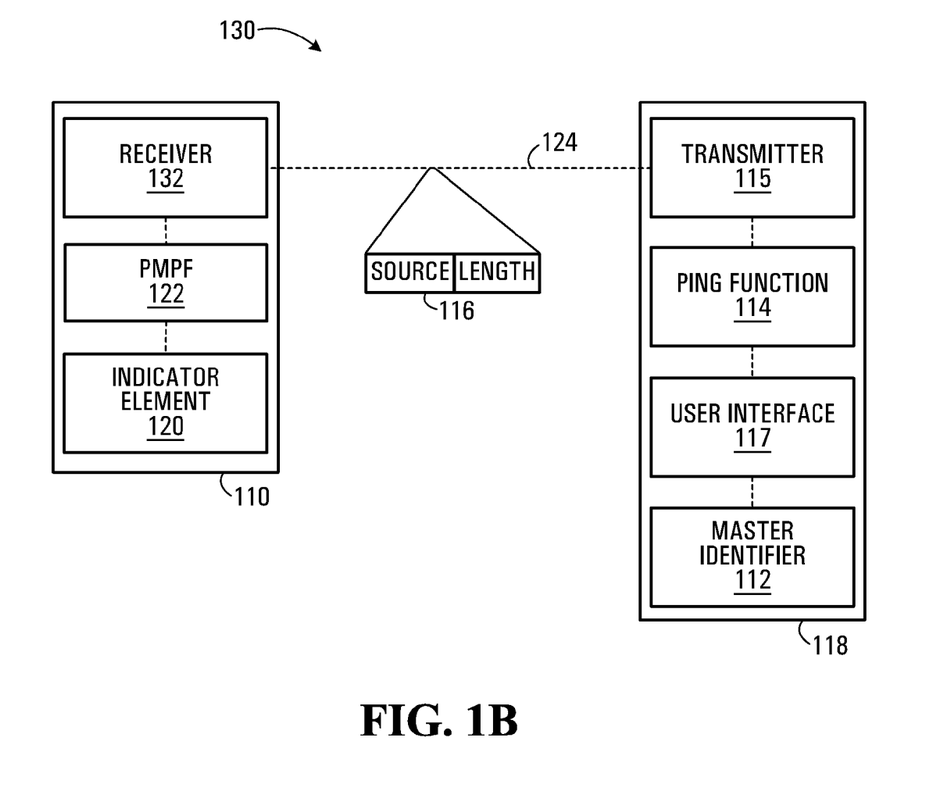
FIG. 1B is a schematic view of another embodiment of a wireless communication network.

In the network 30 of FIG. 1A the master device 10 is the pinging device and the peripherals 18a, 18b, 18c are the pingable devices. A network 130 of FIG. 1B shows the opposite configuration in which a master device 110 is a pingable device and a peripheral 118 is a pinging device. The master device 110 and the peripheral 118 can be the type of electronic devices described in respect to FIG. 1A.

The master device 110 is "paired with" at least the peripheral 118.

The peripheral 118 contains a master identifier 112 or other means known in the art of identifying the master device 110 to which the peripheral 118 is connected and identifying communications channel 124 to the master device 110. The master identifier 112 is generated when the pairing between the master device 110 and the peripheral 118 is established.

The peripheral 118 includes a ping function 114. The ping function 114 may be provided in a manner as described in respect of FIG. 1A. The ping function 114 is initiated through a user interface 117.

The master device 110 has a ping message processing function (PMPF) 122. The ping message processing function 122 allows the master device 110 to receive and respond to a message from the ping function 114. The ping message processing function 122 may be provided as described with respect to FIG. 1A.

The master device 110 has at least one indicator element 120. The indicator element 120 generates an indication that is audible, visible, tactile, or otherwise perceptible to the user as described in respect of FIG. 1A. The master device 110 also includes a receiver 132 for receiving transmissions from the transmitter 115 of the peripheral 118.

The initiation of the ping function 114 generates a ping control message 116. The pinging operation of the network 130 of FIG. 1B is similar to the pinging operation of the network 30 of FIG. 1A. The user initiates the ping function 114 which generates the ping control message 116. The ping function 114 instructs the transmitter 115 to send the ping control message 116 over the communication channel 124 to the receiver 132 of the master device 110. The ping message processing function 122 receives the ping control message 116 through the receiver 132 and actuates the indicator element 120 in accordance with the instructions contained in the ping control message 116.

It will be understood that additional peripherals may be connected to the master device 110 in the network 130.

The various embodiments described with respect to the network 30 of FIG. 1A are also applicable to the network 130 of FIG. 1B.

Figure 2:
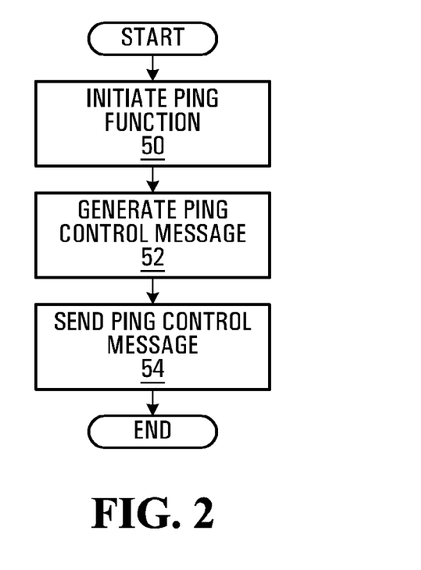
FIG. 2 is a flow diagram of the operation of a pinging device in the wireless communication network of FIG. 1A or FIG. 1B.

FIG. 2 is a flow chart of an example method of the operation of the pinging device of FIGS. 1A and 1B. In step 50, the user initiates the ping function. This may be achieved using any of the means described above. In step 52, the ping function generates the ping control message based on input received from the user. This may be as simple as generating a standard message based on the pressing of a button by the user or may involve multiple user inputs as described below with respect to FIG. 4. Step 54 involves sending the ping control message to the at least one pingable device which is in communication with the pinging device over a respective communication channel.

Figure 3:
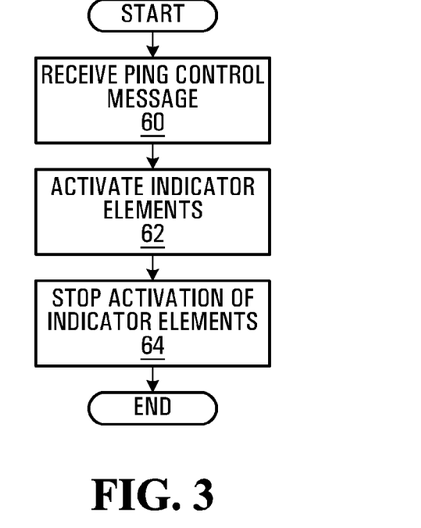
FIG. 3 is a flow diagram of the operation of a pingable device in the wireless communication network of FIG. 1A or FIG. 1B.

FIG. 3 is a flowchart of an example method of the operation of the pingable device of FIGS. 1A and 1B. In step 60, the receiver of the at least one paired pingable device receives the ping control message. In step 62, the ping message processing function actuates one or more indicator elements in accordance with the dictates of the ping control message. In step 64, the ping message processing functions stop the actuation of the indicator elements. The instructions for stopping the actuation of the indicator elements may be received by the ping message processing functions as part of the original ping control message or may comprise a second ping control message. In some embodiments, there are no separate instructions for stopping, stopping happening automatically by a timer.

The user interfaces 17 and 117 may take various forms. In the embodiment described in respect of FIG. 1A, all of the network peripherals 18a, 18b, 18c are paged by one ping control message 16. In that embodiment, the user interface 17 may be in the form of a labelled button on the master device 10 which simply needs to be pressed by the user to initiate the ping function 14. Other user interfaces such as voice recognition, stylus input, trackwheel input, clapping or other distinct sounds detected by a microphone, menu items selected by the user in the GUI, sequence of keystrokes (double-clicking, triple-clicking, or clicking a distinct rhythm) may alternatively be used.

Figure 4A:
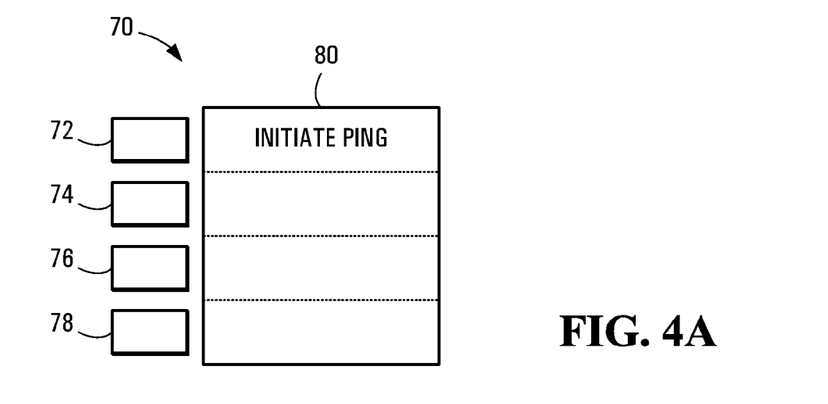
FIGS. 4A to 4C are schematic diagrams of a user interface for the pinging device in the wireless communication network of FIG. 1A or FIG. 1B.
Figure 4B:
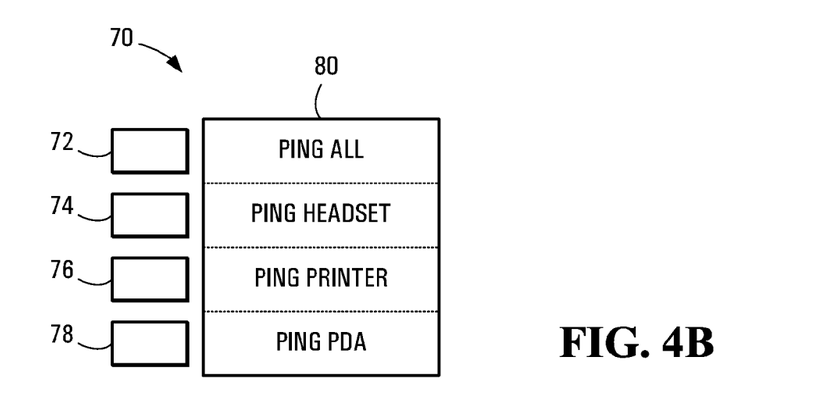
Figure 4C:
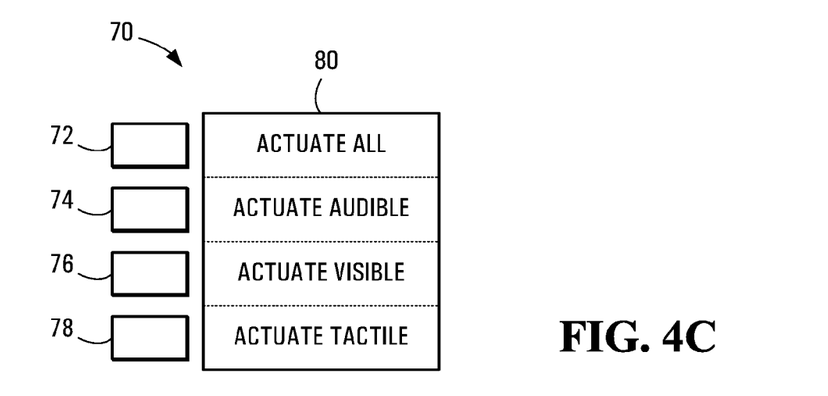

FIGS. 4A to 4C depict a menu user interface 70. The menu user interface 70 consists of a display 80 and buttons (or other user interface elements) 72, 74, 76, 78. Initially, as shown in FIG. 4A, the button 72 is associated with initiating the ping function. The buttons 74, 76, 78 may be associated with other unrelated functions. The depression of the button 72 results in the display of the menu shown in FIG. 4B. The menu of FIG. 4B allows the user to select which paired device to ping. In particular, depressing the button 72 selects the pinging of all paired devices, depressing the button 74 selects the pinging of a paired headset, depressing the button 76 selects the pinging of a paired printer, and depressing the button 78 selects the pinging of a paired PDA. More generally, the display 80 may list any number and combination of paired devices.

The depression of any one of the buttons 72, 74, 76, 78 results in the display of the menu shown in FIG. 4C. The menu of FIG. 4C allows the user to select which indicator elements of the paired devices to actuate. In particular, depressing the button 72 selects the actuation of all indicator elements, depressing the button 74 selects the actuation of audible indicator elements, depressing the button 76 selects the actuation of visible indicator elements, and depressing the button 78 selects the actuation of tactile indicator elements. More generally, the display 80 may allow the actuation of any combination of indicator elements.

The menu user interface 70 provides the ping function 14 with the flexibility to allow the user to ping all of the paired devices or to ping only one or a specific combination of the paired devices. Alternative menu structures which allow for other selection options are also contemplated by this application as well as other forms of user interfaces such as touch screens.

The ping function 14 may allow the user to specify in the ping control message 16 the duration for which the indicator elements 20a, 20b, 20c are actuated.

Alternatively, the ping function 14 may provide instructions in the ping control message 16 to actuate the indicator element 20a, 20b, 20c for a specified length of time or to continue to actuate the indicator elements 20a, 20b, 20c until the ping function 14 is deactivated. These various options can all be provided through the menu user interface. The options can alternatively be offered remotely, through radio or quantum communication, artificial intelligence, or fuzzy logic.

References to computers in this specification include quantum computers.

The above description of embodiments should not be interpreted in any limiting manner since variations and refinements can be made without departing from the scope of the application.

The invention claimed is:

1. A pinging electronic device comprising:
   a ping function adapted to generate at least one associated ping control message for actuation of at least one functional element of at least one pingable electronic device paired to the pinging electronic device, actuation of the at least one functional element used to attract attention to the at least one pingable electronic device; and
   a transmitter adapted to transmit over an ad hoc wireless communication network the at least one associated ping control message to the at least one pingable electronic device;
   wherein the pingable electronic device comprises at least two functional elements that are inherent to the pingable electronic device, but are not dedicated as indicator elements to attract attention to the at least one pingable electronic device upon receipt of the at least one ping control message containing instructions that select which of the at least two functional elements is actuated as an indicator element.

2. The pinging electronic device according to claim 1 wherein the at least one pingable electronic device comprises a plurality of pingable electronic devices and the ping function is adapted to ping all of the plurality of pingable electronic devices.

3. The pinging electronic device according to claim 1 wherein the at least one pingable electronic device comprises a plurality of pingable electronic devices and the ping function is adapted to ping a subset of the plurality of pingable electronic devices based on a user selection.

4. The pinging electronic device according to claim 1 wherein the ping control message sent to each of the at least one pingable electronic devices is identical.

5. The pinging electronic device according to claim 1 wherein the ping control message sent to each of the at least one pingable electronic devices is unique.

6. The pinging electronic device according to claim 1 wherein the pinging electronic device is a master device.

7. The pinging electronic device according to claim 1 wherein the pinging electronic device is a peripheral device.

8. The pinging electronic device according to claim 1 further comprising:
   a user interface configured to:
      allow selection of which of the plurality of pingable devices to transmit the at least one associated ping control message.

9. The pinging electronic device according to claim 8, the user interface further configured to, at least one of:
   allow selection of which of the at least two functional elements that are inherent to the pingable electronic device are to be actuated; and
   allow selection of a duration for actuation of the at least one functional element.

10. The pinging electronic device according to claim 1 wherein the ad hoc wireless communication network is a BLUETOOTH capable or BLUETOOTH like network.

11. An ad hoc wireless communication network comprising:
    a plurality of pingable electronic devices according to claim 10; and
    a pinging electronic device comprising:
       a ping function adapted to generate at least one associated ping control message for actuation of at least one functional element of the at least two functional elements that are inherent to the pingable electronic device, but are not dedicated as indicator elements to attract attention to the at least one pingable electronic device; and
       a transmitter adapted to transmit over an ad hoc wireless communication network the least one associated ping control message to at least one of the plurality of pingable electronic devices.

12. The network according to claim 11 wherein the ping function is adapted to ping all of the plurality of pingable electronic devices.

13. The network according to claim 11 wherein the ping function is adapted to ping a subset of the plurality of pingable electronic devices based on a user selection.

14. The network according to claim 11 wherein the ping control message sent to each of the plurality of pingable electronic devices is identical.

15. The network according to claim 11 wherein the ping control message sent to each of the plurality of pingable electronic devices is unique.

16. The network according to claim 15 wherein the ping message processor of each of the plurality of pingable electronic devices is adapted to decode whether the ping control message contains instructions to ping the pingable electronic device.

17. The network according to claim 11 wherein the ad hoc wireless communication network is a BLUETOOTH capable or BLUETOOTH like network.

18. A pingable electronic device comprising:
    a receiver;
    a ping message processor; and
    at least two functional elements that are inherent to the pingable electronic device, but are not dedicated as indicator elements to attract attention to the at least one pingable electronic device;
    wherein the receiver is adapted to receive a ping control message containing instructions that select which of the at least two functional elements is actuated over an ad hoc wireless communication network and the ping message processor is adapted to actuate at least one of the at least two functional elements in response to the ping control message to attract attention to the at least one pingable electronic device.

19. The pingable electronic device according to claim 18 wherein the ping message processor is adapted to decode whether the ping control message contains instructions to ping the pingable electronic device.

20. The pingable electronic device according to claim 19 wherein the ad hoc wireless communication network is a BLUETOOTH capable or BLUETOOTH like network.

21. A non-transitory computer-readable medium having computer executable instructions stored thereon, the computer executable instructions, when executed by a computer, for performing a method comprising:
    processing a received ping input command;
    generating a ping message that contains instructions to select at least one or at least two functional elements of a pingable electronic device for actuation to attract attention to the at least one pingable electronic device, the at least two functional elements being inherent to the pingable electronic device, but not dedicated as indicator elements to attract attention to the at least one pingable electronic device;

instructing a transmitter to transmit the ping message.

22. The non-transitory computer-readable medium according to claim 21 wherein generating a ping message further comprises:

generating the ping message for pinging multiple pingable electronic devices.

23. The non-transitory computer-readable medium according to claim 21 wherein generating a ping message further comprises:

generating the ping message for pinging a subset of pingable electronic devices based on a user selection.

* * * * *